US011477426B2

(12) United States Patent
Deole et al.

(10) Patent No.: US 11,477,426 B2
(45) Date of Patent: Oct. 18, 2022

(54) SELECTIVE IMAGE BROADCASTING IN A VIDEO CONFERENCE

(71) Applicant: Avaya Management L.P., Santa Clara, CA (US)

(72) Inventors: Pushkar Yashavant Deole, Pune (IN); Valentine C. Matula, Granville, OH (US); Sandesh Chopdekar, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 17/080,608

(22) Filed: Oct. 26, 2020

(65) Prior Publication Data

US 2022/0132090 A1     Apr. 28, 2022

(51) Int. Cl.
| H04N 11/02 | (2006.01) |
| H04N 5/272 | (2006.01) |
| H04N 9/64  | (2006.01) |
| H04N 5/262 | (2006.01) |
| G06T 5/00  | (2006.01) |
| G06K 9/62  | (2022.01) |
| H04N 7/15  | (2006.01) |

(52) U.S. Cl.
CPC ........... *H04N 11/02* (2013.01); *G06K 9/6201* (2013.01); *G06K 9/6256* (2013.01); *G06T 5/003* (2013.01); *H04N 5/2628* (2013.01); *H04N 5/272* (2013.01); *H04N 7/15* (2013.01); *H04N 9/646* (2013.01); *G06T 2207/10016* (2013.01)

(58) Field of Classification Search
CPC .......... H04N 11/02; H04N 5/272; H04N 9/64; H04N 5/262; H04N 7/15; G06T 5/00; G06K 9/00

USPC ............................................. 348/14.01–14.16
See application file for complete search history.

(56) References Cited

U.S. PATENT DOCUMENTS

| 5,917,553 A * | 6/1999 | Honey ................. H04N 5/2723 348/578 |
| 2007/0115350 A1* | 5/2007 | Currivan .................. H04N 7/14 348/14.08 |
| 2016/0260236 A1* | 9/2016 | Fogarty ................. H04N 13/194 |
| 2020/0202496 A1* | 6/2020 | Kokura ..................... G06T 5/00 |

FOREIGN PATENT DOCUMENTS

| EP | 2591466 A1 * | 5/2013 | ............. B42D 15/00 |
| WO | WO-2018120519 A1 * | 7/2018 | ............... G06T 5/00 |
| WO | WO-2019045128 A1 * | 3/2019 | ........... G06F 3/0482 |

OTHER PUBLICATIONS

CN 108986050A, Lu et al; An Image And Video Enhancement Method Based On Multi-branch Convolutio.*

* cited by examiner

*Primary Examiner* — Melur Ramakrishnaiah
(74) *Attorney, Agent, or Firm* — Sheridan Ross P.C.

(57) ABSTRACT

Video conferencing systems are popular means for remote parties to interact in real-time. A user may wish to emphasize certain visual elements of the video conference, for example, a company's logo or the contents of a whiteboard may be important to remain clearly seen by the viewers of the video conference. As elements are obscured, a previously captured image of the obscured visual element may be overlaid on top of the obscuring image to visual remove the obscuring object. Additionally, certain visual elements may be enhanced, such that a small visual element may appear larger or clearer within the video image.

20 Claims, 9 Drawing Sheets

SELECTIVE IMAGE BROADCASTING IN A VIDEO CONFERENCE

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for video imaging and particularly to selectively presenting portions of a video image.

BACKGROUND

Video conferencing is a popular means of communication, whether used in social networks or corporations, video conferencing is used extensively and is expected to rise even further with the remote working culture being promoted in organizations. Video conferencing clients are generally browsers or mobile apps and used on devices, such as laptops, smart phones, tablets etc., which present captured images of person or desired objects using one of the cameras in built into one of the devices. These cameras capture the image of person participating in the video conference, however the cameras have greater span and they also capture and transmit a larger area than just the image of person, this may include surroundings in the room, other persons present in the room and any other objects present in the surrounding space.

Even with improvements in bandwidth for many systems, bandwidth is not infinite and remains a limiting factor in many video conferencing implementations. Some systems utilize codecs that de-emphasize portions of a video image deemed to be less important, and are less demanding on the bandwidth, to allow portions that are deemed to be more important to be able to utilize more bandwidth and thereby provide more detail (e.g., H.264 and H.265). However, configuring a system to know what is and is not important is error prone and easily misapplied. As a result, what is and is not important to participants may be different from what a system has determined to be, or not be, important.

SUMMARY

Systems of the prior art default to identifying certain features of a video image as important and allocate more bandwidth to such subjects and features. For example, motion is often prioritized, such as a presenter moving in front of a static (less important) background or behind a similarly static (less important) foreground. Faces, especially to show the presenter speaking, may also be emphasized. Those features deemed less important are de-emphasized and the resolution, sampling rate, or other quality feature of such portions of the image is reduced. While this may work well in some implementations, it does not universally hold true. As a result, participants are often presented with video images that fail to provide sufficient detail for portions of the video image that are actually the areas of interest.

In one embodiment, a user-selected portion of the image is defined and captured by the camera and transmitted at an emphasized, or not de-emphasized, resolution. The portion may be a static area of the image (e.g., a background feature captured by a fixed camera) or the portion may be dynamic, such as an area of a shirt comprising a company logo. The logo moving with the presenter and selectively disappearing from view as the presenter gestures, and blocks the logo with their hands or arms, or turns their back to the camera.

The user-selected areas may be identified an configured, such as via a touch screen, or other input device, and drawing various shapes to encompass objects of interest, and causing the system to emphasize broadcasting of such objects of interest to the other participants during video conference.

These and other needs are addressed by the various embodiments and configurations of the present invention. The present invention can provide a number of advantages depending on the particular configuration. These and other advantages will be apparent from the disclosure of the invention(s) contained herein.

In one embodiment, a registration for selective image portions is provided by a video conferencing client application (e.g., web app, mobile app). A user can use a finger, mouse, or other input device to select system-identified objects or draw various shapes to mark borders around objects. The image/object(s) within the borders being selected for transmission and/or broadcasting in the video conference as enhanced or not de-enhanced.

Various shapes that user can draw over the touch screen can include circular, rectangular or similar shapes or any custom shape that user wants in order to select the object(s) of interest to be broadcasted more clearly during the video conference (e.g., the user can just select the shape around the face and shoulders to ensure such portions are clearly visible to participants).

Images selected are then analyzed, such as by a conferencing server/system for object identification. Analysis may utilize artificial intelligence (AI) imaging or AI vision techniques, such as machine learning, deep learning, neural network, etc. Various objects present in the selected image are identified. The objects may include live person, photo frame, advertising board on the wall, a logo, an award, memento, or other object.

The selected image optionally can be digitally enhanced, such as zoomed up to a limit where the distortion becomes unacceptable, in order to make the objects more clearly visible in case they are visually small in size (e.g. logo on a shirt, logo on phone, a background object on a wall, etc.)

Identified objects are stored in a database. The database may be a portion of, or accessible to, a conference server. The video captured is fed through at least one processor that executes instructions to does the processing on the video to determine which identified objects, or other objects are identified and process the video image and/or the broadcast video stream accordingly.

In one embodiment, a system for presenting a modified video image is disclosed, comprising: a camera; a processor; a network interface to a network; a data storage; and wherein the processor: receives a video image comprising a number of visual elements captured within the field of view of the camera; accessing a record in the data storage comprising indicia of important visual elements; upon determining that a first element of the number of visual elements matches the record, accessing an enhancement operation associated with the first element; enhancing the video image to produce an enhanced video image comprising the first element, as enhanced by the enhancement operation, and wherein the enhancement is not applied to the entirety of the video image; and transmitting, via the network interface, the enhanced video image to at least one recipient device.

In another embodiment, a method is disclosed, comprising: receiving a video image comprising a number of visual elements captured within a field of view of a camera; accessing a record in a data storage comprising indicia of important visual elements; upon determining that a first element of the number of visual elements matches the record, accessing an enhancement operation associated with the first element; enhancing the video image to produce an enhanced video image comprising the first element, as enhanced by the enhancement operation, and wherein the enhancement is not applied to the entirety of the video image; and transmitting, via a network interface to a network, the enhanced video image to at least one recipient device.

In another embodiment, a video conferencing system is disclosed, comprising: a communication interface to a camera; a processor; a network interface to a network; a data storage; and wherein the processor: receives, from the camera, a video image comprising a number of visual elements captured within the field of view of the camera; accessing a record in the data storage comprising indicia of important visual elements; upon determining that a first element of the number of visual elements matches the record, accessing an enhancement operation associated with the first element; enhancing the video image to produce an enhanced video image comprising the first element, as enhanced by the enhancement operation, and wherein the enhancement is not applied to the entirety of the video image; and transmitting, via the network interface, conference content to at least one recipient device, wherein the conference content comprises the enhanced video image.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive over-view of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
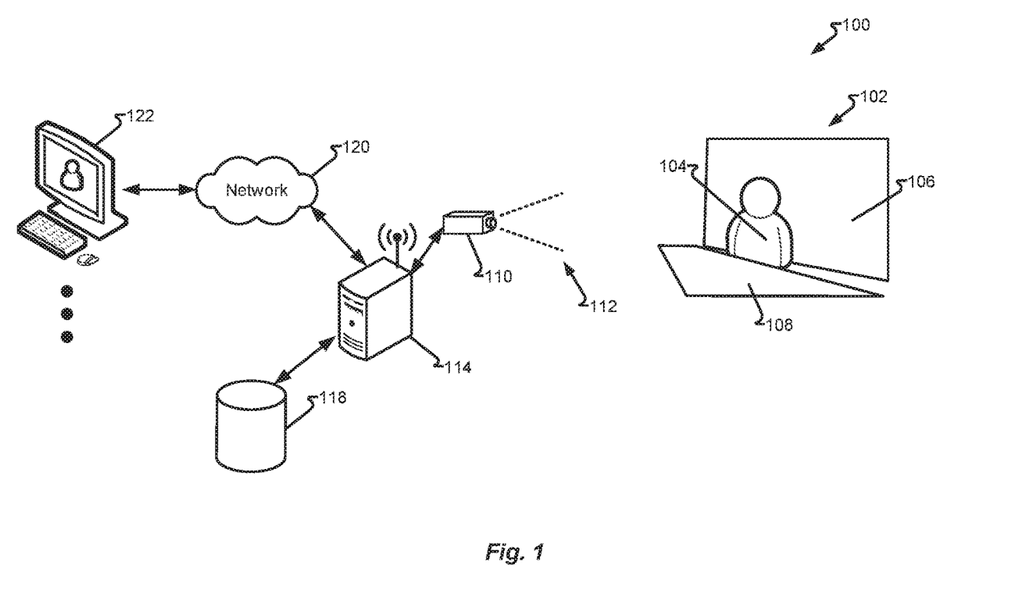
FIG. 1 depicts a first system in accordance with embodiments of the present disclosure.

FIG. 1 depicts system 100 in accordance with embodiments of the present disclosure. In one embodiment, a video conference comprises scene 102, which further comprises presenter 104 as well as other areas which may or may not have importance to the video presentation presented to receiving device 122. Scene 102 is captured within field of view 112 by camera 110, such as video camera 110B, having field of view 112B, or other forms of electronic device (e.g., cell phone, laptop, etc.) comprising at least a camera and a communication interface to network 120 directly or indirectly, such as via server 114. Other media may also be captured for presentation to receiving device 122, such as audio, document images, screen sharing, etc.

Camera 110 may record, process, and broadcast the image of scene 102 as a stand-alone device or with at least some functionality provided by server 114, such as data processing, video conference management, network connectivity, etc. Additionally or alternatively, camera 110 and/or server 114, may comprise or access data storage 118 comprising a non-transitory data storage and which may be used to store media files, data base records, settings, machine-readable instructions, etc. Server 114 may comprise network connectivity to camera 110, such as WiFi, HDMI, ethernet, Bluetooth, and/or other forms of connectivity to enable the video conference to be broadcast via network 120 and presented to receiving device 122. It should be appreciated that receiving device 122 may be any number of devices configured to receive the video conference. In one embodiment, the video conference is in real-time, wherein the events occurring within scene 102 are visible on receiving device 122 with no more delay than that required by the physics of the components utilized to process and transmit the video conference.

While the bandwidth of network 120 and/or other processing and/or transmission limitations prevent the video portion of the video conference from being sent to receiving device 122 at the maximum resolution (e.g., the greatest framerate, highest resolution, widest field of view 112, maximum color depth, etc.) of camera 110. Even with video compression provided by camera 110 and/or server 114, the ability to transmit the maximum resolution to receiving device 122 in real-time and have receiving device 122 receive the video portion without delayed and/or dropped packets that would affect the viewing experience, would be likely.

Prior-art codecs may try to allocate bandwidth to certain areas with a video image. For example, to show faces or areas of an image that move. As a result, other portions of the image are de-emphasized and may get pixelated or otherwise degraded. While this may provide an improved video experience for many situations, such as a lecture when a speaker talking and gesturing is the only source of motion, this is not universally true. For example, a lecture may utilize a board (e.g., chalkboard, whiteboard, sheets of paper on an easel) or other area captured within field of view 112 as an important, or even the most important, part of the video portion of the video conference. For example, a professor of art may which to discuss the fine details found in piece of artwork displayed on a board. Even though the artwork is static, maintaining a high image quality may be important to the purpose of the video conference. If, for example, the professors gesturing and movement within field of view 112 causes the background, including the board with the artwork, to be de-prioritized, such as to prioritize the motion and face of the professor, the artwork may become blurry, blocky, or otherwise have an insufficient resolution for the purpose of the video conference, namely to present a clear image of the artwork presented on the board.

Figure 2:
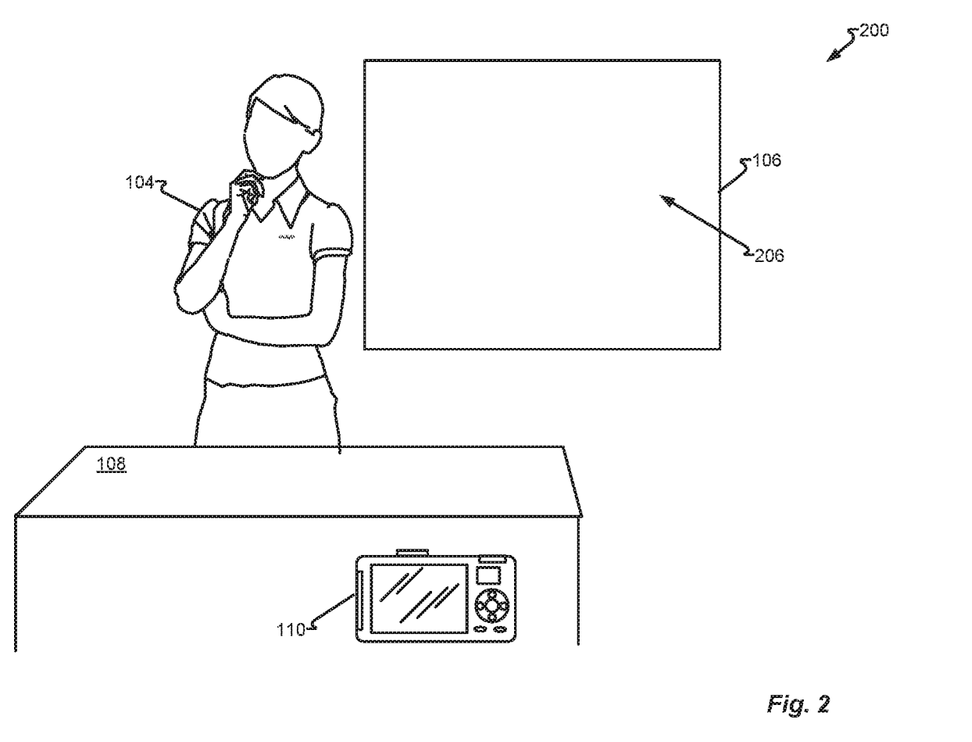
FIG. 2 depicts a configuration scene in accordance with embodiments of the present disclosure.

FIG. 2 depicts configuration scene 200 in accordance with embodiments of the present disclosure. In one embodiment, camera 110 captures configuration scene 200 with the field of view (not shown) of camera 110. Configuration scene 200 may comprise one or more of presenter 104 and/or other non-presenting human, background 106 comprising board 206, and/or foreground 108 (e.g., desk, table, etc.). It should be appreciated that other objects may be present including, but not limited to, books or papers on foreground 108, important and unimportant objects in background 106. What is and is not important may be defined, at least initially by a user. In other embodiments, a neural network may be trained to recognize important and unimportant objects from an initial and, as necessary, subsequent training.

Figure 3:
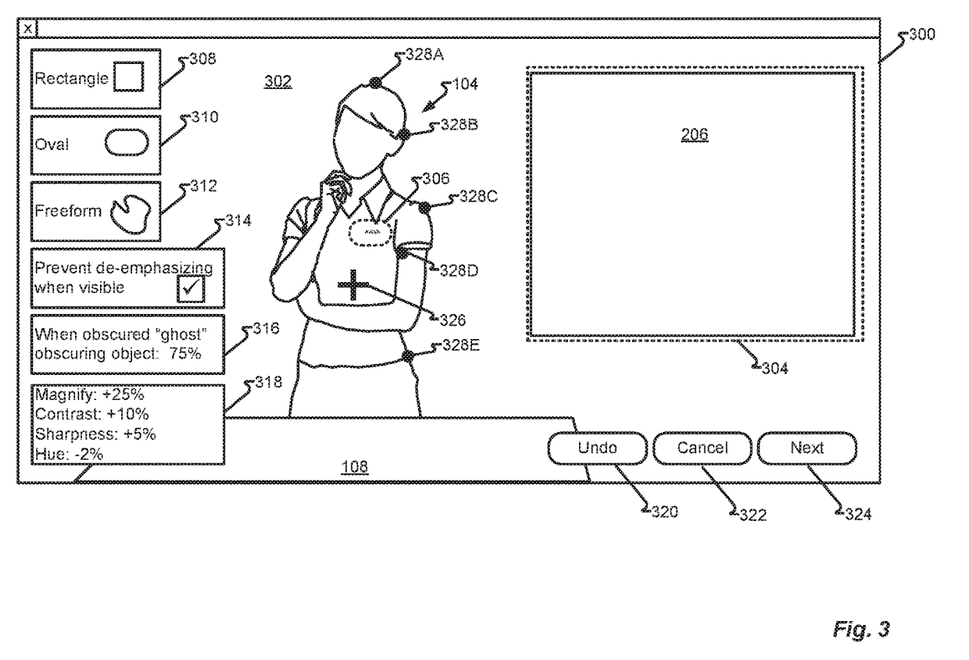
FIG. 3 depicts a configuration application interface in accordance with embodiments of the present disclosure.

FIG. 3 depicts configuration application interface 300 in accordance with embodiments of the present disclosure. In one embodiment, configuration application interface 300 presents configuration scene 200 (see FIG. 2) as captured by camera 110 (Id.) and displayed as configuration image 302. Configuration application interface may be an application running on a device comprising camera 110, server 114, and/or a separate device (e.g., a laptop or tablet computer in communication with server 114).

In other embodiment, drawing tools are provided that may be selected and manipulated to designate important visual elements. For example, rectangle 308 enables a rectangle draw tool, such as to draw a rectangle or square around similarly shaped important visual elements, such as to form important visual element 304 comprising board 206. Oval 310 enables an oval draw tool, such as to draw an oval or circle around similarly shaped important visual elements, such as to form important visual element 306. Freeform tool 312 enables the freeform tool wherein the user can draw any closed shape. It should be appreciated that other and/or additional drawing aids may be provided as a matter of design choice, such as undo option 320, cancel option 322, and next option 324, such as undo a last operation on configuration application interface 300, exit without saving changes, and moving to a next step, respectively.

In another embodiment, an important visual element may be processed in various ways. For example, upon selecting prevent de-emphasizing option 314, the associated important visual element will not be de-emphasized, such as when it is static. For example, the contents of important visual element 304, when prevent de-emphasizing option 314 is selected, causes the contents therein to not be de-emphasized, such as when bandwidth requires other portions within the video image to be degraded.

In another embodiment, an important visual element may be always presented. That is to say, when the important visual element is obscured, such as by presenter 104 moving in front of important visual element 304, the important visual element is overlaid on top of the obscured portion to "ghost" the obscuring object. As a result, a previously captured image of board 206 is overlaid on the obscuring object with a degree of transparency ranging from 0% ("ghosting" is disabled and obscuring objects entirely block the important visual element) to 100% (obscuring objects are visually removed) as provided by "ghosting" option 316. In another embodiment, the obscuring object is edge-detected and presented as an outline with the interior entirely or partially transparent.

In another embodiment, the obscuring object is replaced with a representation object as an enhancement. For example, a pointer (e.g., arrow, reticle, etc.), may be provided in place of the presenter 104's finger, hand, and/or arm. The pointer may be presented as opaque or partially transparent.

In another option, such as via options 318, other enhancements may be provided to a designated important visual element. For example, magnification may overlay the important visual element, such as important visual element 306 (e.g., company logo), with an enlarged image of important visual element 306. Similarly, an important visual element, may be presented with a different contrast, sharpness, hue, gamma correction, color shift, and/or other visual alteration.

The location of certain important visual element (e.g., important visual element 304) are static and, as long as camera 110 is not moved or field of view 112 altered, whatever is captured within important visual element 304 will be emphasized (or not de-emphasized) as configured. However, the location of other important visual elements (e.g., important visual element 306) are dynamic within field of view 112. For example, presenter 104 may turn, move left or right or move toward or away from camera 110. In order to designate the location to overlay the important visual element 306 with the enhanced version of the image, the location of the important visual element 306 is determined within a current frame. In one embodiment, this may be performed by machine vision trained to identify a particular visual feature (e.g., text, image, etc.). In other embodiments, this location my need to be determined relative to other features, such as reference markers 328 electronically drawn on presenter 104. As a result, an enhanced image may be overlaid at a certain location (e.g., 305 degrees from vertical from reference marker 328D, at one half the distance between reference marker 328D and 328C; 171 degrees from reference marker 328A, 75% towards centroid 326 of presenter 104; etc.). As a result, when presenter 104 turns away from camera 110, such as to face board 206, when presenter 104 turns back to rc100, the enhanced image is overlaid on important visual element 306.

With the benefit of configuration application interface 300, a component, such as server 114 may cause camera 110 to capture images of important visual elements, apply enhancements determined at least in part by inputs to configuration application interface 300, create an enhanced visual element to overlay as configured. The records of the important visual elements, their location, types of enhancements provided, and/or a graphical image of the enhanced visual image may be maintained in data storage 118.

Figure 4:
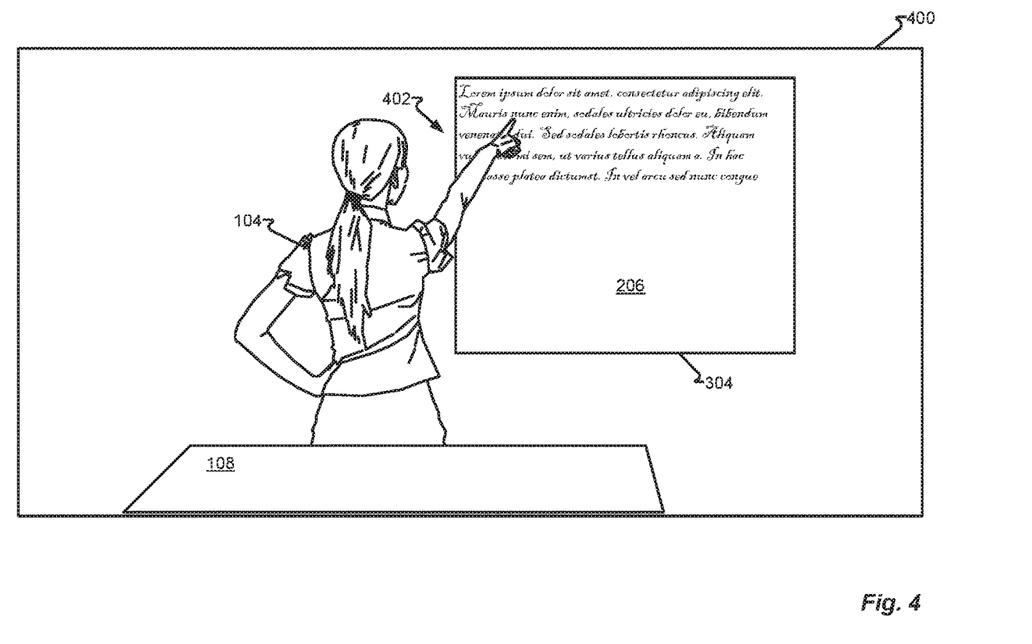
FIG. 4 depicts a captured scene in accordance with embodiments of the present disclosure.

FIG. 4 depicts captured scene 400 in accordance with embodiments of the present disclosure. In one embodiment, captured scene 400 is captured by camera 110 as a portion of a video conference. Captured scene 400 may be a raw input into server 114, or other processing component, from camera 110. Captured scene 400 shows presenter 104 partially obscuring board 206, designated as important visual element 304. Obscured portion 402 is not overlaid and board 206 remains obscured. Additional visual images, such as foreground 108 may also be captured.

Figure 5:
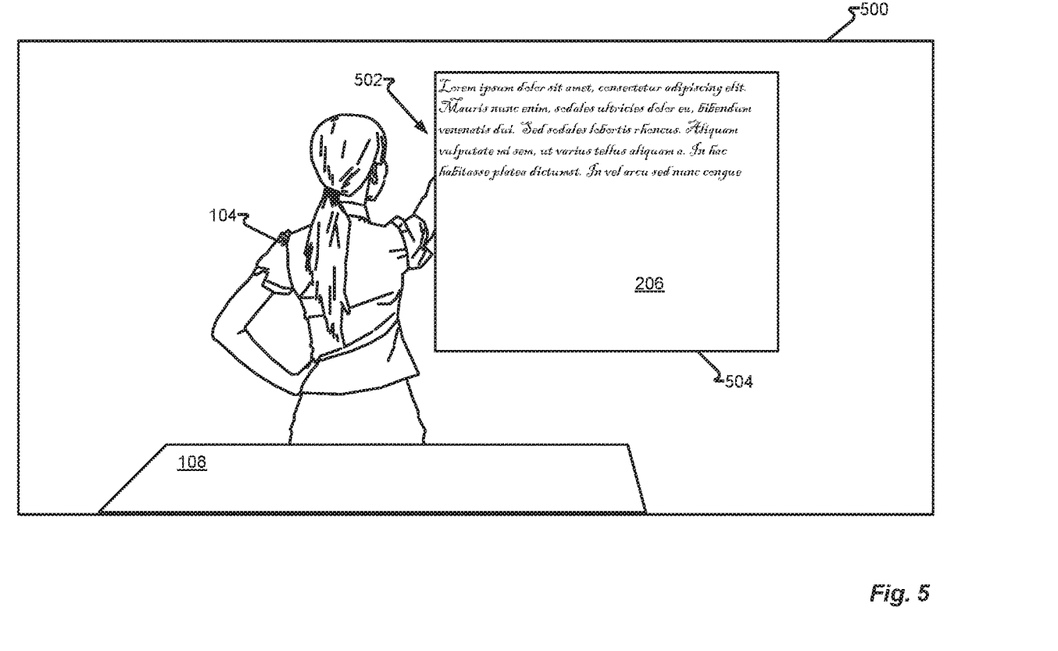
FIG. 5 depicts a first presentation scene in accordance with embodiments of the present disclosure.

FIG. 5 depicts presentation scene 500 in accordance with embodiments of the present disclosure. In one embodiment, presentation scene 500 is captured by camera 110, processed, and transmitted to receiving device 122 as a portion of a video conference. Presented scene 500 shows presenter 104 partially blocking board 206 but with enhanced visual element 504, previously captured by camera 110, overlaying obscured portion 502 entirely. As a result obscured portion 502 is rendered invisible.

Figure 6:
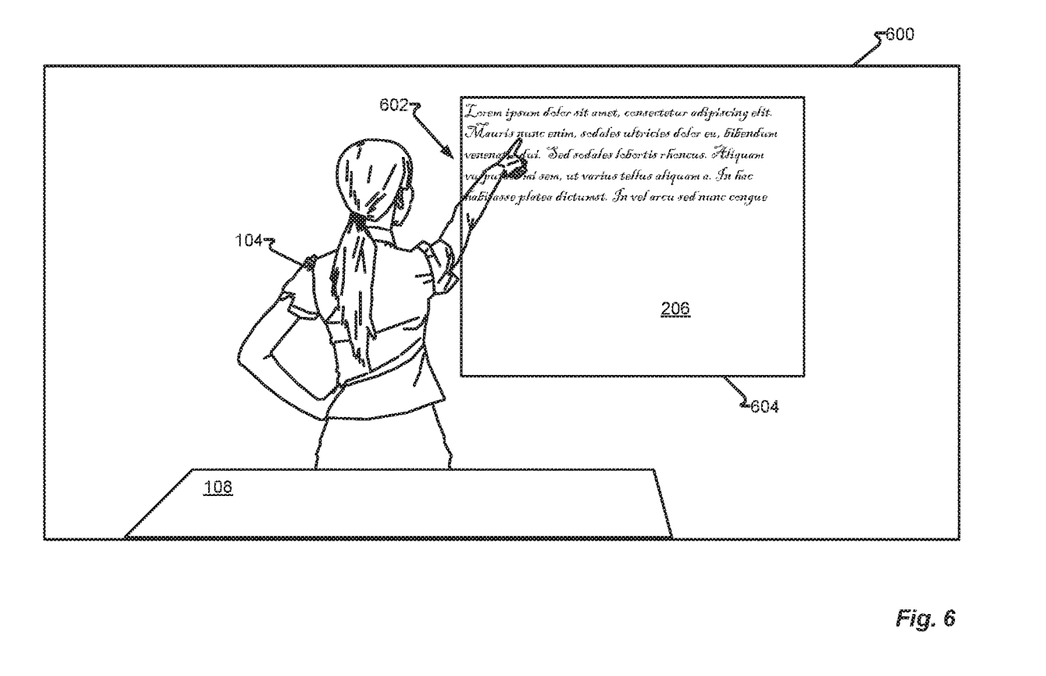
FIG. 6 depicts a second presentation scene in accordance with embodiments of the present disclosure.

FIG. 6 depicts presentation scene 600 in accordance with embodiments of the present disclosure. In one embodiment, presentation scene 600 is captured by camera 110, processed, and transmitted to receiving device 122 as a portion of a video conference. Presented scene 600 shows presenter 104 partially blocking board 206 but with enhanced visual element 604, previously captured by camera 110, overlaying obscured portion 602 in part. As a result obscured portion 602 is rendered partially invisible or "ghost" like.

Figure 7:
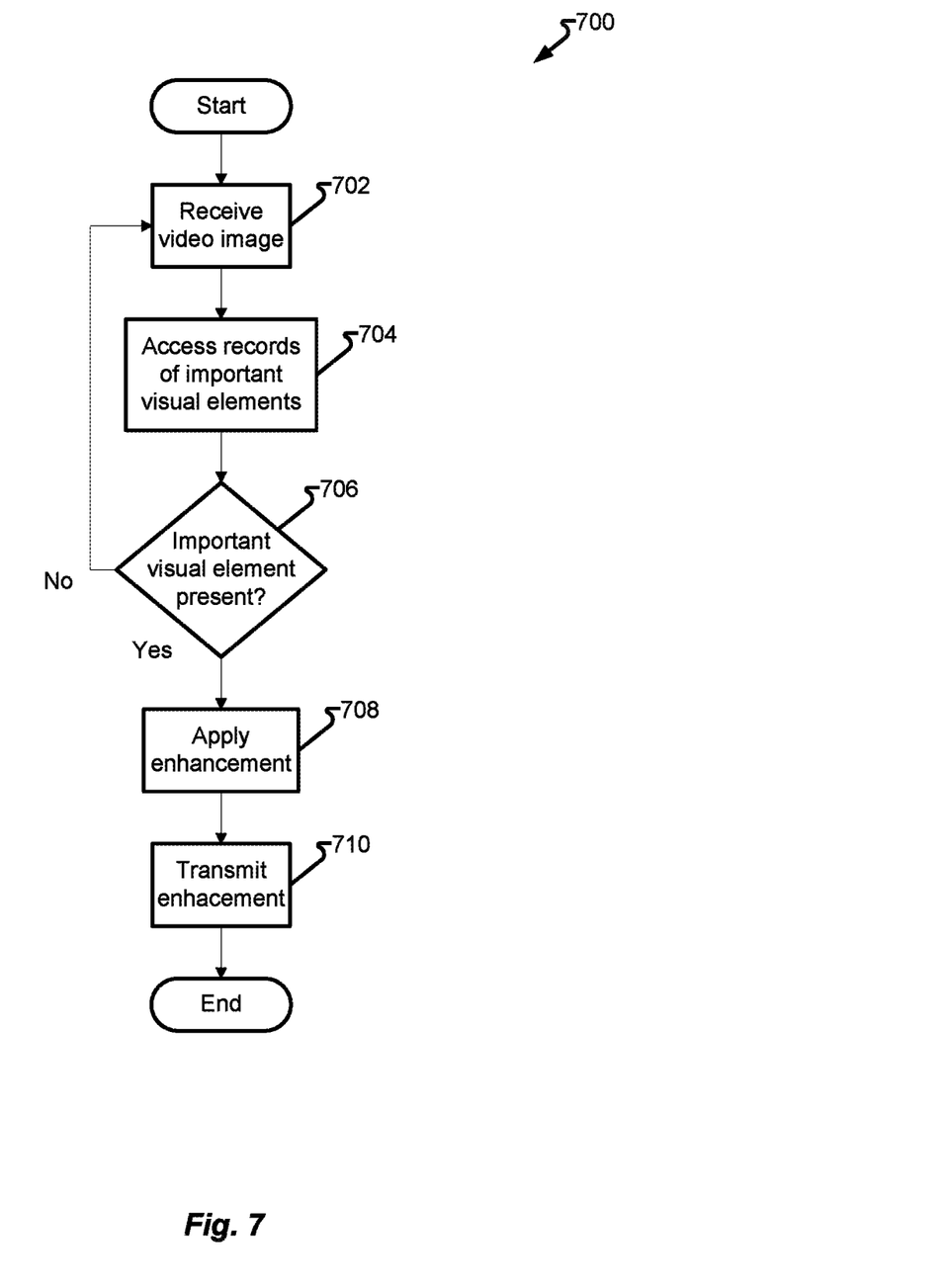
FIG. 7 depicts a process in accordance with embodiments of the present disclosure.

FIG. 7 depicts process 700 in accordance with embodiments of the present disclosure. In one embodiment, process 700 may be embodied as machine-readable instructions for execution by a processor, such as one or more processors of server 114, camera 110, and/or other component. Step 702 receives a video image from camera 110. Step 704 accesses records of important visual events, such as may be maintained in data storage 118 in response to executing a configuration application, such as one having configuration application interface 300.

Next, test 706 determines if any important visual elements are present and, if determined in the negative, processing continues back to step 702, such as to transmit the video image without enhancement. If test 706 is determined in the affirmative, processing continues to step 708 wherein the enhancement is provided, such as to overlay a currently captured important visual element with a previously captured image of the important visual element and/or enhanced version of the previously captured visual element. Then, in step 710 the video stream, with the enhanced visual element, is transmitted, such as to receiving device 122.

Figure 8:
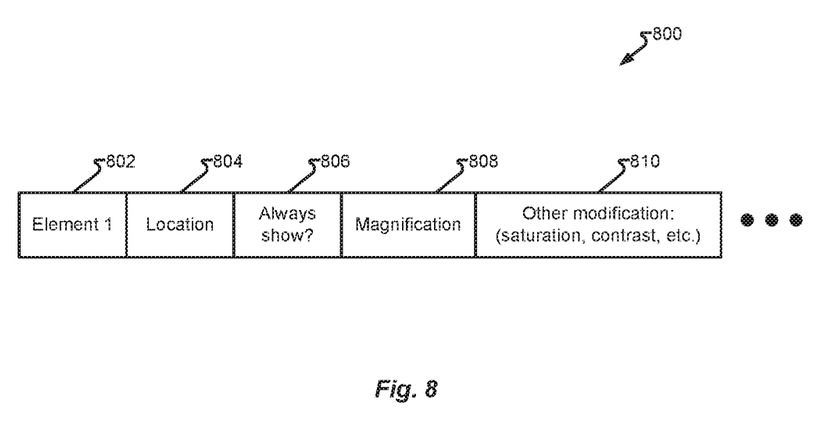
FIG. 8 depicts a data structure in accordance with embodiments of the present disclosure.

FIG. 8 depicts data structure 800 in accordance with embodiments of the present disclosure. In one embodiment, data structure 800 is maintained in data storage 118 accessible to server 114. In one embodiment, data structure 800 identifies fields of records and may comprise one or more of, element identifier field 802 (e.g., record number, element machine name, element human readable name, etc.), location field 804 (e.g., wherein within the frame the important visual element is located or where, in reference to other visual identifiers such as centroid 326 and/or reference markers 328, is the important visual element located); always show field 806 (if 'no' or '0%', obscuring objects are unaltered; if 'yes' or a value greater than zero, then to the designated amount, an obscuring object is partially or entirely overlaid with a previously captured image); magnification field 808 (e.g., overlay the visual important image with a magnified version of itself, the magnification factor specified herein); other modification field 810 to specify other and/or additional visual modifications to an enhanced visual element utilized to overlay an important visual element, when obscured (e.g., when the value of always show field 806 is 'yes' and an obscuring object is present) or otherwise when the important visual element is visible to camera 110, but an enhanced image thereof is selected.

Data structure 800 may comprise additional and/or alternative fields. For example, certain visually important elements may require a human to take some action. For example, a data value for a time since an important visual element was last captured for presentation on a device visible to presenter 104. (e.g., "Please move away from the board to allow re-capture.").

Figure 9:
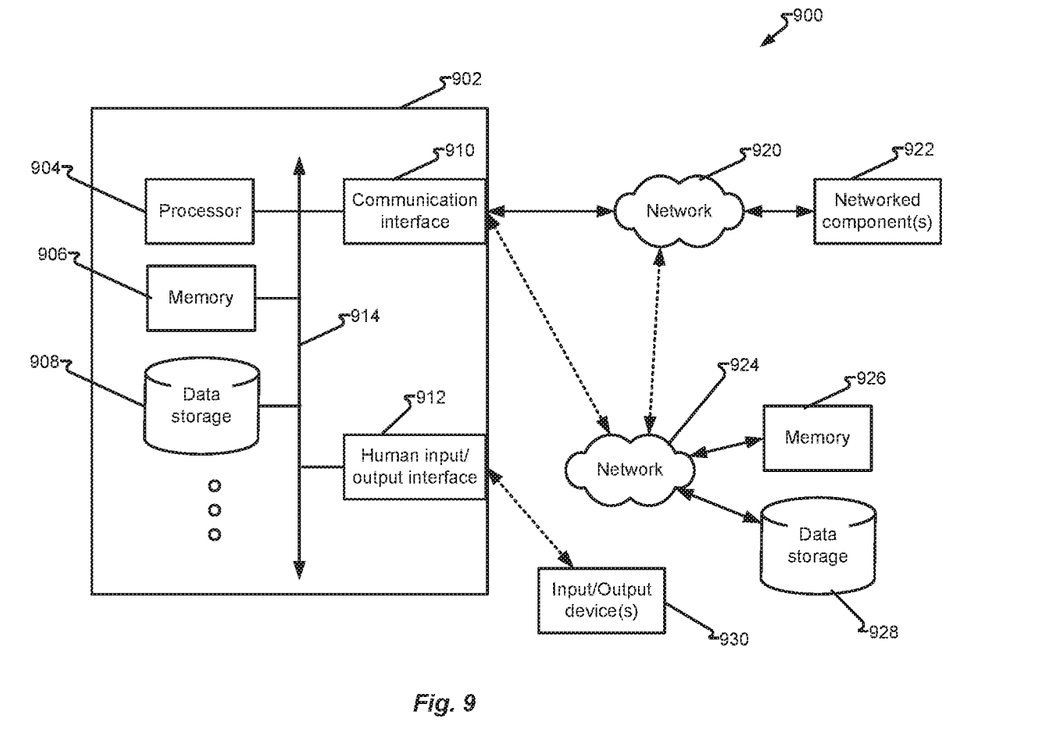
FIG. 9 second system in accordance with embodiments of the present disclosure.

FIG. 9 depicts device 902 in system 900 in accordance with embodiments of the present disclosure. In one embodiment, server 114 and/or camera 110 may be embodied, in whole or in part, as device 902 comprising various components and connections to other components and/or systems. The components are variously embodied and may comprise processor 904. Processor 904 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 914, executes instructions, and outputs data, again such as via bus 914. In other embodiments, processor 904 may comprise a shared processing device that may be utilized by other processes and/or process owners, such as in a processing array or distributed processing system (e.g., "cloud", farm, etc.). It should be appreciated that processor 904 is a non-transitory computing device (e.g., electronic machine comprising circuitry and connections to communicate with other components and devices). Processor 904 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 904) and the hardware and other circuitry thereof.

In addition to the components of processor 904, device 902 may utilize memory 906 and/or data storage 908 for the storage of accessible data, such as instructions, values, etc. Communication interface 910 facilitates communication with components, such as processor 904 via bus 914 with components not accessible via bus 914. Communication interface 910 may be embodied as a network port, card, cable, or other configured hardware device. Additionally or alternatively, human input/output interface 912 connects to one or more interface components to receive and/or present information (e.g., instructions, data, values, etc.) to and/or from a human and/or electronic device. Examples of input/output devices 930 that may be connected to input/output interface include, but are not limited to, keyboard, mouse, trackball, printers, displays, sensor, switch, relay, etc. In another embodiment, communication interface 910 may comprise, or be comprised by, human input/output interface 912. Communication interface 910 may be configured to communicate directly with a networked component or utilize one or more networks, such as network 920 and/or network 924.

Network 120 may be embodied, in whole or in part, as network 920. Network 920 may be a wired network (e.g., Ethernet), wireless (e.g., WiFi, Bluetooth, cellular, etc.) network, or combination thereof and enable device 902 to communicate with network component(s) 922. In other embodiments, network 920 may be embodied, in whole or in part, as a telephony network (e.g., public switched telephone network (PSTN), private branch exchange (PBX), cellular telephony network, etc.)

Additionally or alternatively, one or more other networks may be utilized. For example, network 924 may represent a second network, which may facilitate communication with components utilized by device 902. For example, network 924 may be an internal network to a business entity or other organization whereby components are trusted (or at least more so) that networked components 922, which may be connected to network 920 comprising a public network (e.g., Internet) that may not be as trusted.

Components attached to network 924 may include memory 926, data storage 928, input/output device(s) 930, and/or other components that may be accessible to processor 904. For example, memory 926 and/or data storage 928 may supplement or supplant memory 906 and/or data storage 908 entirely or for a particular task or purpose. For example, memory 926 and/or data storage 928 may be an external data repository (e.g., server farm, array, "cloud," etc.) and allow device 902, and/or other devices, to access data thereon. Similarly, input/output device(s) 930 may be accessed by processor 904 via human input/output interface 912 and/or via communication interface 910 either directly, via network 924, via network 920 alone (not shown), or via networks 924 and 920. Each of memory 906, data storage 908, memory 926, data storage 928 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 930 may be a router, switch, port, or other communication component such that a particular output of processor 904 enables (or disables) input/output device 930, which may be associated with network 920 and/or network 924, to allow (or disallow) communications between two or more nodes on network 920 and/or network 924. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for presenting a modified video image, comprising:
   a camera;
   a processor;
   a network interface to a network;
   a data storage; and
   wherein the processor:
      receives a video image comprising a number of visual elements captured within a field of view of the camera wherein, at a first time, the video image captures a first element of the number of visual elements;
      accesses a record in the data storage comprising indicia of important visual elements;
      upon determining, at a second time after the first time, that the first element of the number of visual elements matches the record, accessing an enhancement operation associated with the first element;
      enhance the video image to produce an enhanced video image comprising the first element, as enhanced by the enhancement operation, and wherein the enhancement is not applied to an entirety of the video image and wherein the enhancement operation overlays the previously captured video image of the first element on top of an obscuring visual feature that obscures the first element; and
   transmit, via the network interface, the enhanced video image to at least one recipient device.

2. The system of claim 1, wherein the enhancement operation comprises the processor de-enhancing the video image to reduce bandwidth utilized to transmit the enhanced video image, wherein the first element is excluded from the de-enhancing operation.

3. The system of claim 1, wherein the processor overlays the previously captured video image with a degree of transparency to allow the obscuring visual feature to remain partially visible.

4. The system of claim 1, wherein the enhancement operation comprises the processor overlaying a previously captured image of the first element, on top of a currently captured image of the first element, wherein the previously captured image has been visually enhanced.

5. The system of claim 4, wherein the previously captured image has been visually enhanced comprises one or more contrast modification, saturation modification, hue modification, brightness modification, color alteration, rotation, de-rotation, or sharpening.

6. The system of claim 1, wherein:
   the record comprises a boundary-limited portion of the first element previously captured and a location of the first element relative to a second element of the number of visual elements; and
   the processor, upon determining the video image comprises at least a portion of the second element and the location of the first element relative to the second element, overlays the first element at the location.

7. The system of claim 6, wherein:
   the second element comprises a number of views corresponding to variations of at least one of rotation or translation of the second element within the video image;
   the location of the first element is relative to ones of the number of views of the second element; and
   the processor determines the video image comprises at least the portion of the second image and the location, further comprises the processor determining the video image comprises a current view matching one of the number of views of the second element and the location relative thereto and, in response to the determination, overlays the first element at the location relative to the current view of the second element.

8. The system of claim 7, further comprising the processor altering the first element similarly to the at least one of rotation or translation of the second element within the video image.

9. The system of claim 1, wherein the processor determines the first element matches the record comprising, matching the first element to a neural network trained to recognize the first element.

10. The system of claim 9, wherein the neural network is trained, the training comprising:
accessing a set of data entries that comprise the first element;
applying one or more transformations to the set of data entries including rotation, translation, color alteration, contrast alteration, sharpness alteration to create a set of modified data entries;
creating a first training set comprising a collected set of data entries, the modified set of data entries, and a set of non-first element data entries;
training the neural network in a first stage of training using the first training set;
creating a second training set for a second stage of training comprising the first training set and the set of non-first element data entries that are incorrectly detected as data entries that comprise the first element in the first stage of training; and
training the neural network in a second stage using the second training set.

11. A method, comprising:
receiving a video image comprising a number of visual elements captured within a field of view of a camera wherein, at a first time, the video image captures a first element of the number of visual elements;
accessing a record in a data storage comprising indicia of important visual elements;
upon determining, at a second time after the first time, that the first element of the number of visual elements matches the record, accessing an enhancement operation associated with the first element;
enhancing the video image to produce an enhanced video image comprising the first element, as enhanced by the enhancement operation, and wherein the enhancement operation is not applied to an entirety of the video image; and
transmitting, via a network interface to a network, the enhanced video image to at least one recipient device.

12. The method of claim 11, wherein the enhancement operation comprises de-enhancing the video image to reduce bandwidth utilized to transmit the enhanced video image, wherein the first element is excluded from the de-enhancing operation.

13. The method of claim 11, wherein overlaying the previously captured video image comprises overlaying the previously captured video image with a degree of transparency to allow an obscuring visual feature to remain partially visible.

14. The method of claim 11, wherein enhancing comprises overlaying a previously captured image of the first element, on top of a currently captured image of the first element, wherein the previously captured image has been visually enhanced.

15. The method of claim 14, wherein the previously captured image has been visually enhanced comprising one or more of contrast modification, saturation modification, hue modification, brightness modification, color alteration, rotation, de-rotation, sharpening, or object substitution.

16. The method of claim 11, further comprising:
the record, further comprising a boundary-limited portion of the first element previously captured and a location of the first element relative to a second element of the number of visual elements; and
upon determining the video image comprises at least a portion of the second element and the location of the first element relative to the second element, overlaying the first element at the location.

17. The method of claim 16, further comprising:
the second element comprising a number of views corresponding to variations of at least one of rotation or translation of the second element within the video image;
the location of the first element is further relative to ones of the number of views of the second element;
altering the first element similarly to the at least one of rotation or translation of the second element within the video image and
upon determining the video image comprises at least the portion of the second image and the location, further comprises, upon determining the video image comprises a current view matching one of the number of views of the second element and the location relative thereto and, in response to the determination, overlaying the first element at the location relative to the current view of the second element.

18. A video conferencing system, comprising:
a communication interface to a camera;
a processor;
a network interface to a network;
a data storage; and
wherein the processor:
receives, from the camera, a video image comprising a number of visual elements captured within a field of view of the camera wherein, at a first time, the video image captures a first element of the number of visual elements;
accesses a record in the data storage comprising indicia of important visual elements;
upon determining, at a second time after the first time, that the first element of the number of visual elements matches the record, accesses an enhancement operation associated with the first element;
enhances the video image to produce an enhanced video image comprising the first element, as enhanced by the enhancement operation, and wherein the enhancement operation is not applied to an entirety of the video image; and
transmits via the network interface, conference content to at least one recipient device, wherein the conference content comprises the enhanced video image.

19. The system of claim 18, wherein:
the record, further comprises a boundary-limited portion of the first element previously captured and a location of the first element relative to a second element of the number of visual elements; and
the processor, upon determining the video image comprises at least a portion of the second element and the location of the first element relative to the second element, overlays the first element at the location.

20. The system of claim 19, further comprising:
the second element comprising a number of views corresponding to variations of at least one of rotation or translation of the second element within the video image;
the location of the first element is further relative to ones of the number of views of the second element;
the processor alters the first element similarly to the at least one of rotation or translation of the second element within the video image; and
upon determining the video image comprises at least the portion of the second image and the location, further comprises, upon determining the video image comprises a current view matching one of the number of views of the second element and the location relative thereto and, in response to the determination, overlaying the first element at the location relative to the current view of the second element.

\* \* \* \* \*

UNITED STATES PATENT AND TRADEMARK OFFICE
CERTIFICATE OF CORRECTION

PATENT NO. : 11,477,426 B2
APPLICATION NO. : 17/080608
DATED : October 18, 2022
INVENTOR(S) : Pushkar Yashavant Deole et al.

It is certified that error appears in the above-identified patent and that said Letters Patent is hereby corrected as shown below:

In the Claims

Column 18, Line 55, Claim 18 after "transmits" insert --,-- therein.

Signed and Sealed this
Third Day of January, 2023

Katherine Kelly Vidal
*Director of the United States Patent and Trademark Office*